3 Sheets--Sheet 1.
J. C. RICHARDSON.
Manufacture of Trowels.
No. 164,331. Patented June 8, 1875.
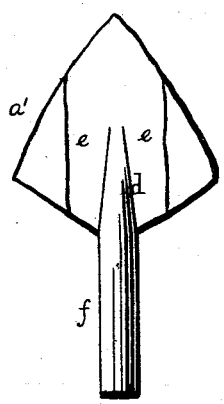
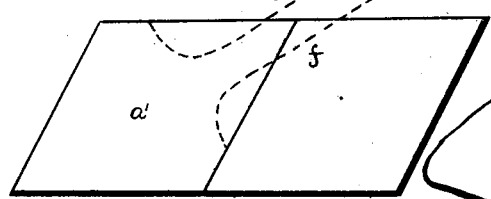
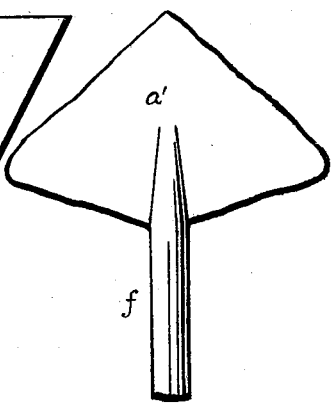
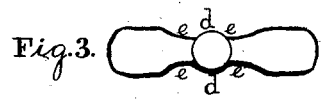
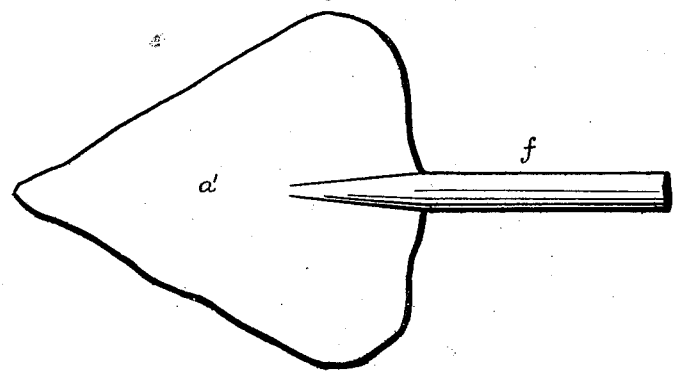
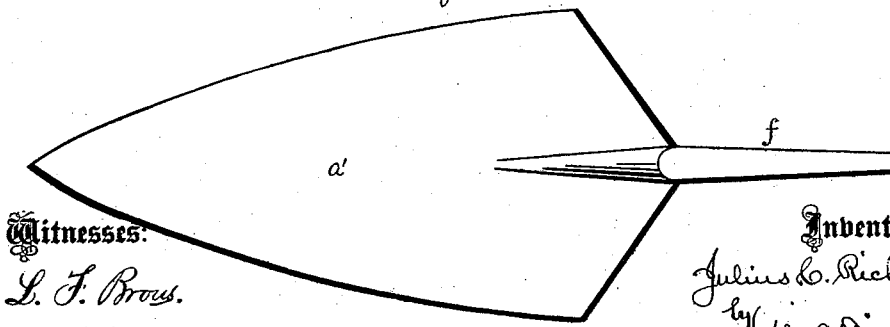
Witnesses:
L. F. Brous.
A. P. Grant.
Inventor:
Julius C. Richardson
by
John A. Wiedersheim
Atty.

J. C. RICHARDSON.
Manufacture of Trowels.
No. 164,331. Patented June 8, 1875.

Witnesses: Inventor:
A. P. Grant. Julius C. Richardson
L. F. Brous. by Joshua A. Undershein
Atty.

3 Sheets--Sheet 2.

THE GRAPHIC CO. PHOTO-LITH. 39 & 41 PARK PLACE, N.Y.

J. C. RICHARDSON.
Manufacture of Trowels.
No. 164,331. Patented June 8, 1875.
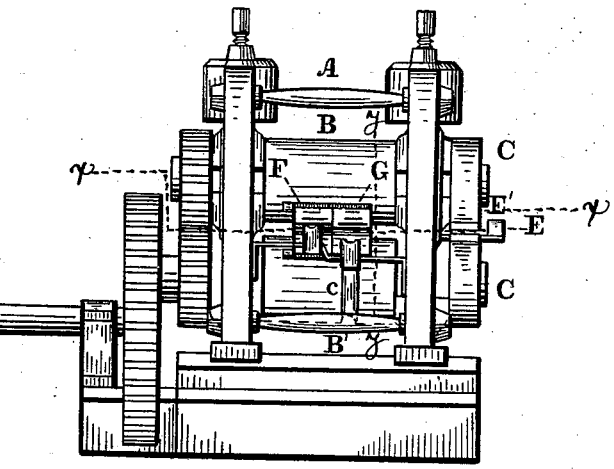
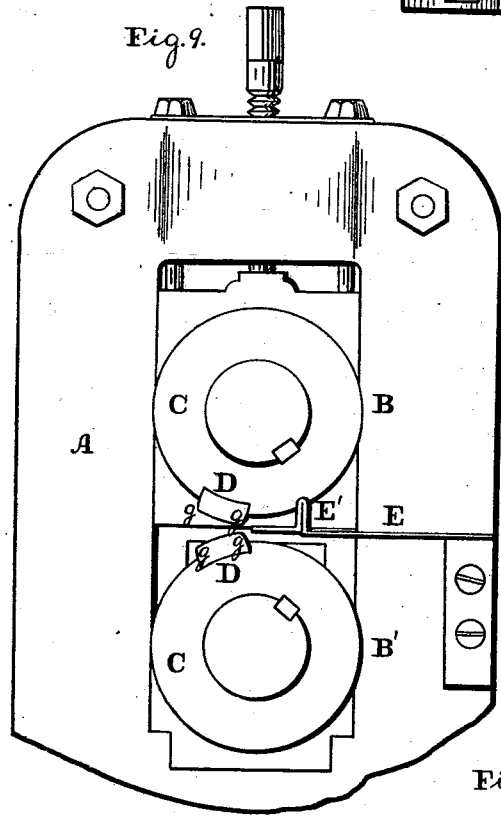
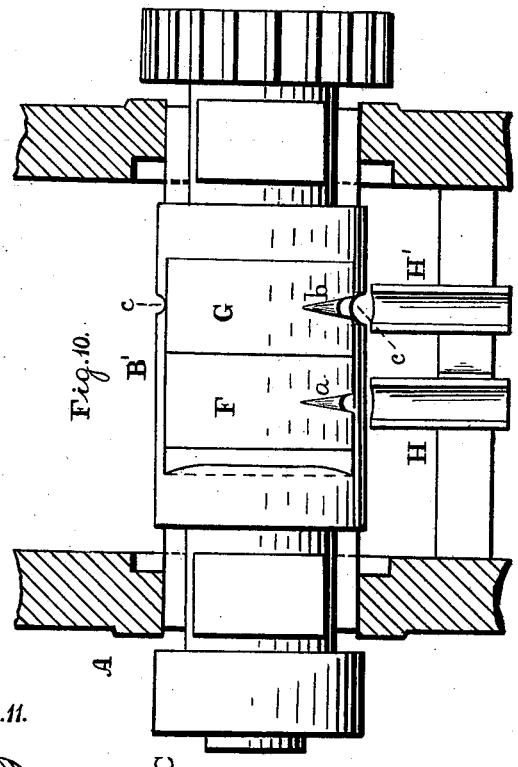
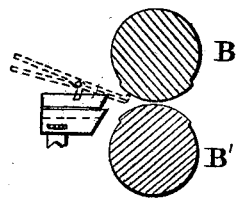
Witnesses:
L. F. Brous.
A. P. Grant.
Inventor:
Julius C. Richardson,
by
John A. Diedesheim
Atty.

UNITED STATES PATENT OFFICE.

JULIUS C. RICHARDSON, OF MANLIUS, NEW YORK.

IMPROVEMENT IN THE MANUFACTURE OF TROWELS.

Specification forming part of Letters Patent No. 164,331, dated June 8, 1875; application filed November 28, 1874.

*To all whom it may concern:*

Be it known that I, JULIUS C. RICHARDSON, of Manlius, in the county of Onondaga and State of New York, have invented a new and useful Improvement in Forging Trowels; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figures 1A, 1B:
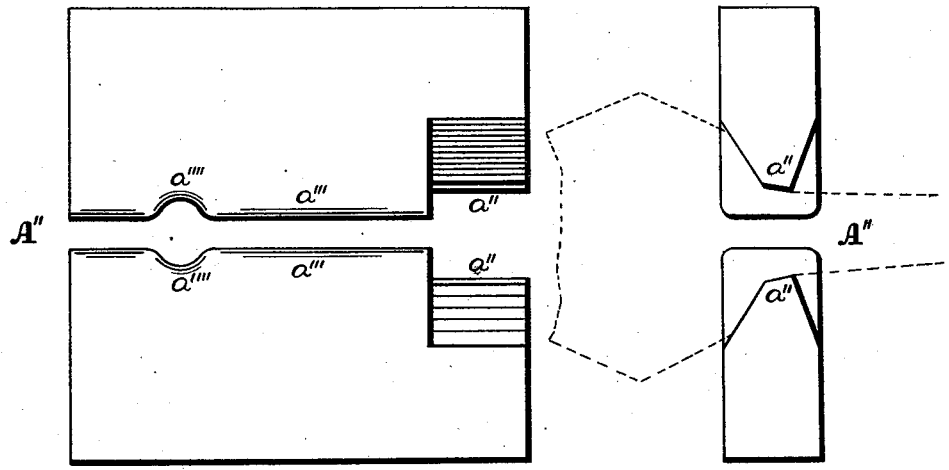
Figure 1C:
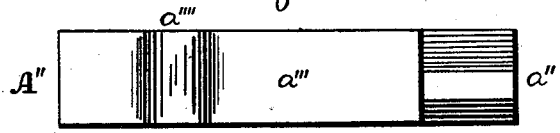
Figures 1D, 1E:
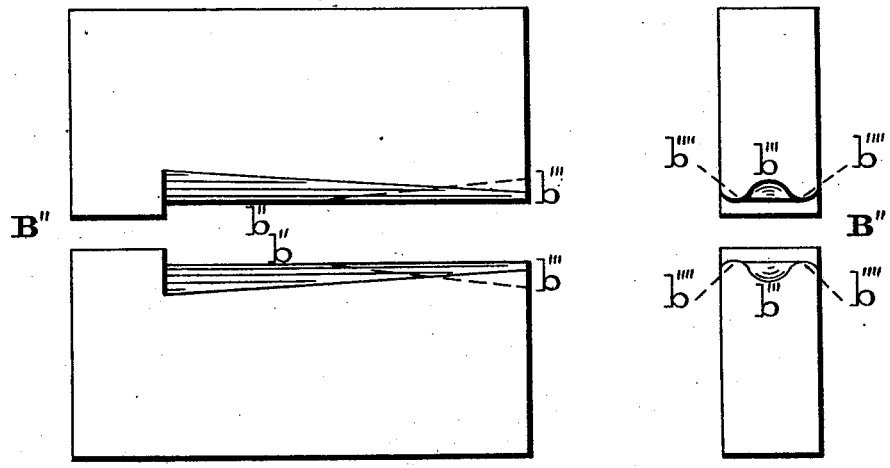
Figure 1F:
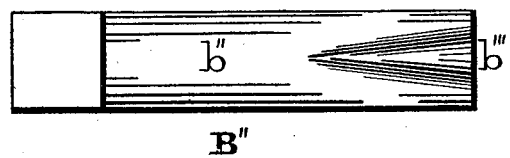

Figures 1, 2, 3, 4, 5, 6, and 7 illustrate successive operations partially embodying my invention. Fig. 1$^a$ is a side view of one of the dies employed in the operation. Fig. 1$^b$ is an end view thereof. Fig. 1$^c$ is a face view of one of the dies. Fig. 1$^d$ is a side view of another of the dies employed in the operation. Fig. 1$^e$ is an end view thereof. Fig. 1$^f$ is a face view of one of the dies. Fig. 8 is a front view of the forging apparatus. Fig. 9 is an end view thereof. Fig. 10 is a horizontal section of a portion thereof in line $x$ $x$, Fig. 8. Fig. 11 is a vertical section of a portion in line $y$ $y$, Fig. 8.

Similar letters of reference indicate corresponding parts in the several figures.

My invention consists in the manufacture of trowels by successive forging operations. It also consists in dies for forming the blank into a slug. It also consists in dies for roughing and finishing the trowel and guides therefor.

Referring to the drawings, A represents the housing, in which are journaled the rolls B B', which are suitably geared and operated in any well-known manner. The journals of the rolls are extended laterally, and on the ends of the same are fixed rolls C C, to which are secured flat-faced spreading-dies D D, which project beyond the face of the rolls C. E represents a bed or support, secured to a proper portion of the housing, and consisting of a bar or plate which is arranged to occupy a position in front of the rolls C, and in line with the horizontal space between said rolls. The rolls B B' carry dies F, which are termed "roughing-dies," and aside thereof dies G, which are termed "finishing-dies," the faces of the dies projecting above the faces of the said rolls B B'. The die F has the face of one of its parts of plain curved form, and on the same is a longitudinally-extending groove, $a$, which is of shape corresponding to the rib of the trowel. The counterpart of the die has a plain curved face. Both parts of the die G are similar to those of the die F, excepting that the groove $b$ is larger than the groove $a$. The face of the roll B' is grooved circumferentially, as at $c$, and coincides with the groove $a$ of the die F, so that it is continuous of said groove $a$. In front of the rolls B B', and occupying positions in relation to the dies F G, are horizontally-arranged guides H H', which are located in lines one above the other, and have their upper faces grooved.

The operation is as follows: A rectangular bar of metal is cut into blanks of rhomboidal form. The blank is presented sidewise, or between its sides, at a point between the center and one end to the action of dies A'', Fig. 1$^a$, and at a right angle to the longitudinal direction thereof, as seen in Fig. 1$^b$, said dies having at one end faces $a''$, which are pointed or somewhat V-shaped, so as to work down the blank and produce the shank or tang $f$, which I then subject to the flat faces $a'''$ of the dies, so as to straighten the same. The tang is then inserted between the curved depressed faces $a''''$ of the dies, and thereby rounded, thus producing the slug $a'$.

In Figs. 1$^d$, 1$^e$, and 1$^f$ are shown dies B'' for the next operation, and which have flat faces $b''$, conical-shaped depressions $b'''$, and walls $b''''$, aside of said depressions, these parts extending the longitudinal direction of the dies. The slug $a'$, grasped by the tang, is laid between the dies B'', in the longitudinal direction thereof, whereby said slug will have formed with it the rib $d$ and the depressions $e$ $e$ aside of the rib, as shown in Fig. 2. The slug is then grasped by the shank or tang $f$ portion and laid on the support E against the stop E', and presented to the dies D in the direction of the line of the axis of the rolls B B'. As the rolls rotate, the edges $g$ $g$ of the dies D E enter the depressions $e$ of one side of the shaped slug, and the faces of the roll press against the body of the slug, and spread the same in the direction from middle to side.

The slug is then reversed, and the other side subjected to the same process, whereby the metal is properly spread, and assumes the form shown in Fig. 4. The shaped metal is now passed to the die F, or what is known as the roughing-pass, the tongs employed therefor being provided with feet at the rear of their axes, and have the inner faces of their jaws grooved longitudinally. The foot of the tongs rests on the grooved guide H, and the metal is passed toward the rolls to full extent, the rolls moving toward the operator. The rib $d$ of the metal is adapted to enter the groove $a$ of the die F, and the die acts on the metal, so that as it emerges therefrom the form it assumes is that shown in Fig. 5. The shank or tang portion is then bent by suitable devices into the form shown in Fig. 6, after which the shaped metal is passed face downward toward the finishing-die G to full extent, the foot of the tongs resting on the lower guide H′, and the rolls moving toward the operator. The rib of the metal will enter the groove $b$ of the die G, and the shank or tang will enter the groove $c$ of the roll B′, and when the die acts on the metal the result is the finishing of the slug or blank, as is shown in Fig. 7, the oxide having been removed after the roughing-pass, and just before the finishing-heat.

By these means the cost of work will be vastly reduced, and the product found superior in quality and finish.

Having thus described my invention, what I claim as new, and desire to secure by Letters Patent, is—

1. The improvement in the manufacture of trowels involved in the successive forging operations stated, and illustrated in Figs. 1 to 11 and $1^a$ to $1^f$, inclusive, for the purpose set forth.

2. The dies A″, with working faces $a''\ a'''\ a''''$, substantially as and for the purpose set forth.

3. The dies B″, with working faces $b''\ b'''\ b''''$, substantially as and for the purpose set forth.

4. The die F, with groove $a$, die G, with groove $b$, and the roll B′, with groove $c$, continuous of the groove $b$, in combination with the upper guide H and lower guide H′, substantially as and for the purpose set forth.

JULIUS C. RICHARDSON.

Witnesses:
JOHN A. WIEDERSHEIM,
ALBERT H. HOECKLEY.